United States Patent [19]

Costard

[11] Patent Number: 5,028,469

[45] Date of Patent: Jul. 2, 1991

[54] LIGHTWEIGHT CONSTRUCTIONAL ELEMENT OF SANDWICH STRUCTURE

[76] Inventor: Hellmuth Costard, Grenzstrasse 136, 4200 Oberhausen, Fed. Rep. of Germany

[21] Appl. No.: 372,331

[22] PCT Filed: Oct. 4, 1988

[86] PCT No.: PCT/EP88/00881

§ 371 Date: Jun. 6, 1989

§ 102(e) Date: Jun. 6, 1989

[87] PCT Pub. No.: WO89/03299

PCT Pub. Date: Apr. 20, 1989

[30] Foreign Application Priority Data

Oct. 8, 1987 [DE] Fed. Rep. of Germany ....... 3734373

[51] Int. Cl.[5] .............................................. B32B 3/12
[52] U.S. Cl. ...................................... 428/73; 52/806;
428/116; 428/912.2
[58] Field of Search ................ 428/73, 116, 117, 118,
428/912.2, 903.3; 52/354, 576, 577, 806;
156/292

[56] References Cited

U.S. PATENT DOCUMENTS

| 1,708,462 | 4/1929 | Bodman | 52/577 X |
| 2,043,445 | 6/1936 | Oxhandler | 52/354 |
| 3,134,705 | 5/1964 | Moeller | 428/116 X |
| 3,743,568 | 7/1973 | DeWolf | 428/116 X |
| 3,754,812 | 8/1973 | Mohn | 428/116 X |
| 3,878,661 | 4/1975 | Moore | 428/116 X |
| 4,050,978 | 9/1977 | Moore | 428/117 X |
| 4,068,429 | 1/1978 | Moore | 428/116 X |

Primary Examiner—Henry F. Epstein
Attorney, Agent, or Firm—Michael J. Striker

[57] ABSTRACT

The lightweight constructional element of a sandwich structure having two cover plates comprises a honeycomb structure arranged between the cover plates which holds the cover plates spaced from each other. The honeycomb structure is formed by empty cans, especially used beverage cans, placed side by side whose axes are at right angles to the cover plates and which are arranged in a close packed or a rectangular array. The cans may be attached by adhesive to form a low cost lightweight and strong array.

8 Claims, 2 Drawing Sheets

LIGHTWEIGHT CONSTRUCTIONAL ELEMENT OF SANDWICH STRUCTURE

BACKGROUND OF THE INVENTION

The invention relates to a lightweight constructional element or structural member of a sandwich structure having two cover plates which are held at a distance apart by a honeycomb structure. Said lightweight constructional element is intended in particular as a structural part of a solar collector.

Solar collectors require a very large area because the incident energy radiation of the sun per square meter is relatively small. Such solar collectors are set up as large paraboloids on steel frames and must follow the path of the sun. To achieve adequate energy yield a large area is necessary which in turn means a relatively high weight. As support for such paraboloids usually lightweight structural members or constructional elements are employed which however have to be specially made and are very expensive. Such lightweight constructional elements as described for example in DE-OS 2,836,418 can however also be used as support for solar cells.

THE SUMMARY OF THE INVENTION

Accordingly, it is an object of my invention is to provide a lightweight constructional element in particular for solar collectors which is relatively economical, can be easily made and has high strength.

In keeping with these objects and with other which will become apparent hereinafter, the honeycomb structure between the cover plates is formed by essentially cylindrical cans whose axes are perpendicular to the cover plates. This provides a lightweight structural member having basic elements which do not need to be specially made but which are obtained from waste products. In can recycling as hitherto employed only the material value of the drink cans was of interest. However, due to their precise shape these cans, which accrue in very large quantities, have a very much higher value than that of their raw material alone.

In particular, the substantially cylindrical sheet metal cans made by extrusion of aluminium, aluminium alloys or steel have in spite of their very small wall thickness of for example 0.07 to 0.1 mm a very high dimensional stability in the axial direction. This dimensional stability is increased still further in used beverage cans by the lid which is connected at its periphery to the cylindrical wall of the can by folding. Opening the can by pulling out an opening tab does not appreciably change this very high dimensional stability. These drink cans, connected together in as close an arrangement as possible along their lines of contact, in particular adhered together, form the cells of the honeycomb structure which in known manner is also connected by adhesion to the cover plates.

In the production of these drink cans of standardised size and form from aluminium or steel a certain percentage of rejects always occurs and hitherto these were melted down again. These reject cans, due to their shape, can be used just like already used cans as honeycomb cells for this lightweight constructional element. Since these reject cans are not provided with a lid it is possible to connect them together also by spot welding or riveting.

To obtain a homogeneous lightweight constructional element which can be loaded equally on both sides it is advantageous to arrange these cans which are open on one side so that they bear with the bottom side in uniform distribution alternately on the one cover plate and on the other cover plate.

BRIEF DESCRIPTION OF THE DRAWINGS

Examples of the invention will be described in detail in the following description with reference to the drawings, wherein.

DETAILED DESCRIPTION OF THE INVENTION

Figure 1:
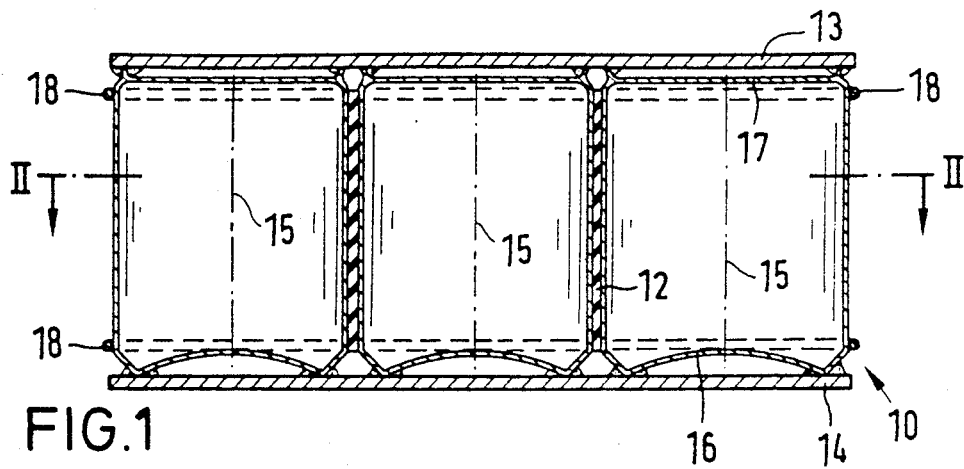
FIG. 1 is a view of a lightweight constructional element along the section line I—I of FIG. 2.
Figure 2:
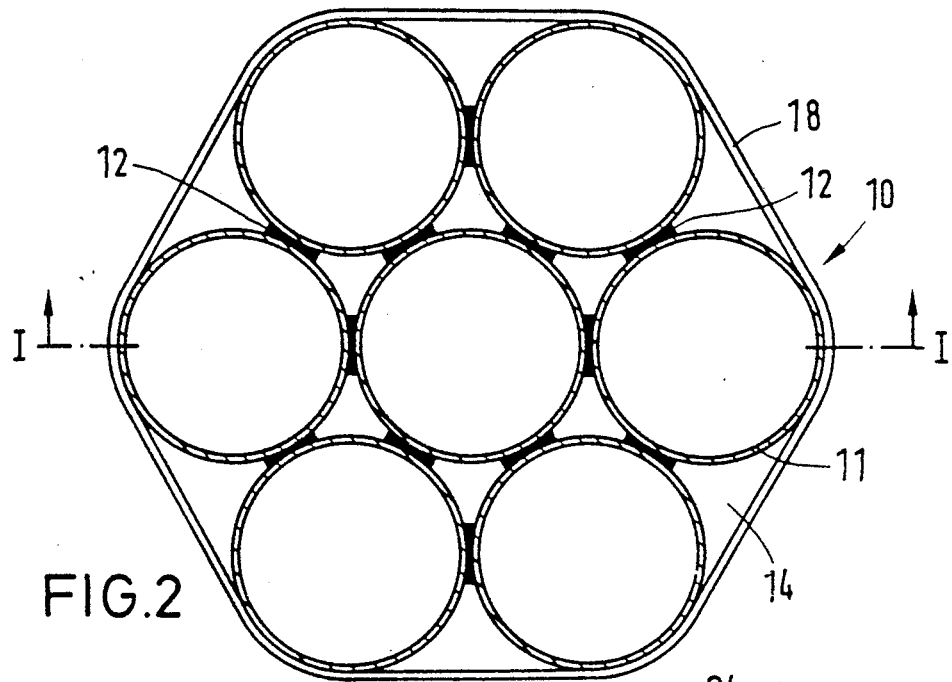
FIG. 2 is a cross sectional view of the lightweight constructional element along the section line II—II of FIG. 1.

The lightweight constructional element 10 according to FIGS. 1 and 2 consists of empty cans 11 which are connected together at their contact points 12 and are arranged between two cover plates 13, 14. The cans 11 connected together in tight packing form a honeycomb structure which is connected by adhesion, for example by means of epoxy resin, to the cover plates 13 and 14. The connecting of the cans 11 can be effected by adhesion, soldering or welding. The adhesion of the cans 11 can also be effected by initial dissolving of the stove enamel with which the beverage cans 11 have already been painted in their production to show their contents and as protection against corrosion. To improve the connection of the cans 11 with each other the cans of a lightweight constructional element 10 may be clasped or tied with a wire 18 or a band. Since in the vicinity of the bottom 16 and the lid 17 beverage cans also take up laterally acting forces said clasping wire 18 is preferably to be arranged in the vicinity of the cover plates 13, 14.

Figure 3:
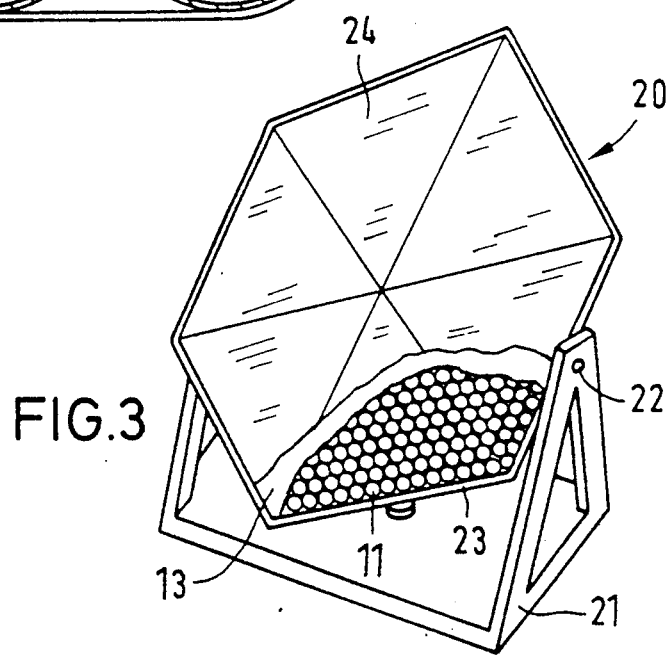
FIG. 3 is a perspective view of a solar collector or parabolic mirror of which the support plate is a lightweight constructional element according to the invention.

The lightweight constructional elements 10 according to the invention are suitable in particular as support element for large-area solar collectors, parabolic mirrors 20 and plane mirrors for heliostats. FIG. 3 shows a parabolic mirror 20 having a large-area support 23 which is formed by a lightweight constructional element according to the invention which is installed on a framework 16 so that the mirror can follow the sun.

Figure 4:
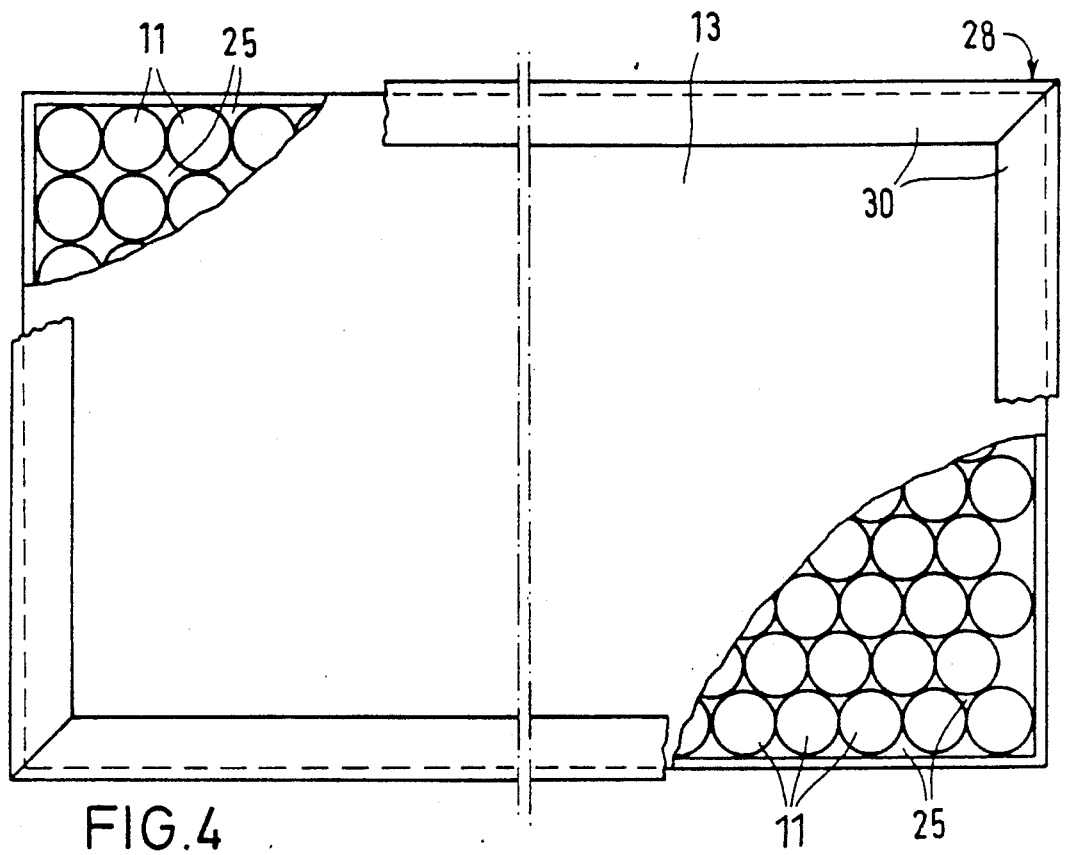
FIG. 4 is a plan view, partially in section, of two different embodiments of the lightweight constructional element according to my invention.

The lightweight constructional elements according to FIGS. 2 and 3 are hexagonal. As FIG. 4 shows, they may also be rectangular or square. As apparent from the left part of FIG. 4 the cans 11 can be arranged in vertical and horizontal parallel rows or, as shown by the right part of FIG. 4, in extremely tightly packed array in which each horizontal row R is offset with respect to the adjacent row R' by the radius of the cans 11. In this arrangement the intermediate spaces 25 are smaller than the intermediate spaces 25' in the arrangement first described. The extremely tightly packed array shown on the right is often called a close packed or hexagonal close packed array (in two dimensions). This close packed array provides the closest type of packing, i.e. the packing in which the cans occupy the greatest fraction of the space in the constructional element or in other words leave a minimum fraction of intermediate space. Furthermore the cans shown in FIG. 4 are open on top.

The edges of the lower cover plate 14 are bent upwardly so that said cover plate 14 with the side walls 26 forms an open box having a size adapted to the size of the cans 11 in such a manner that the cans 11 can be inserted into the box with slight play. The remaining gaps between the cans 11 are filled with adhesive. The adhering of the cans 11 to each other and to the cover plates 13 and 14 can also be effected by foamed plastic which fills the intermediate spaces 25 or 25' at least in the more highly stressed regions. It is also possible to fill the cans 11 with foam to increase the loadability of the constructional element. To take up relatively large forces and enable them to be dissipated the constructional element is surrounded by a frame 28 of Uprofile rails 29 having flanges 30, 31 which engage over the edges of the cover plates 13, 14.

Figure 5:
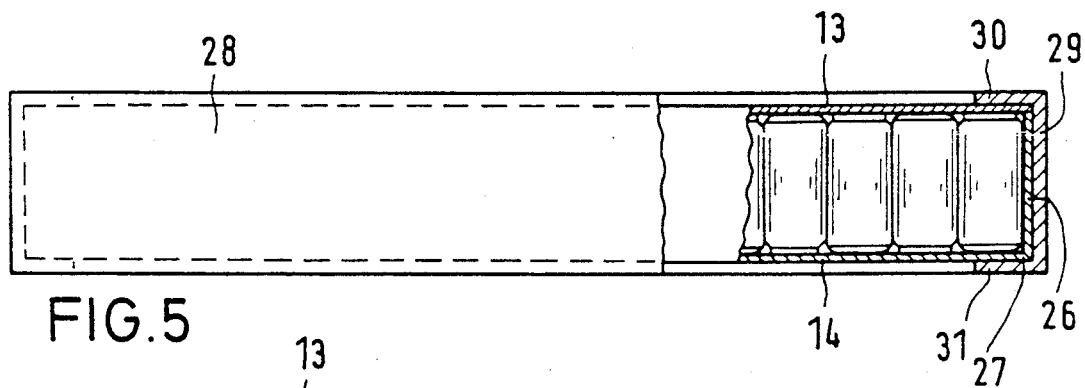
FIG. 5 is a side view of a lightweight constructional element according to the invention, partially in section.

As FIG. 5 shows the cans 11 are arranged in uniform distribution with their bottoms 16 bearing alternately on the one cover plate 13 or the other cover plate 14 to obtain good homoqeneity of the constructional element.

Figure 6:
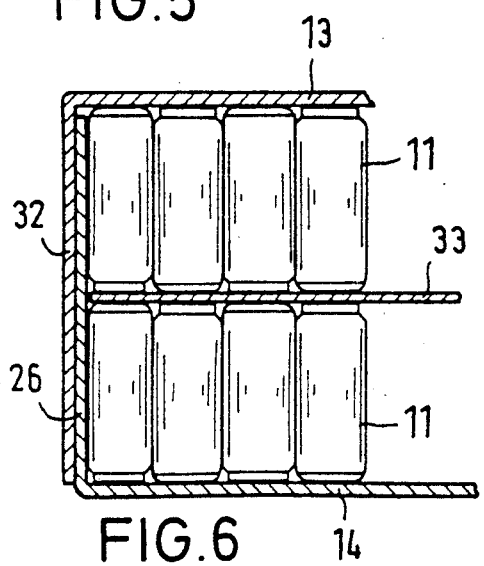
FIG. 6 is a sectional view of a lightweight constructional element having two honeycomb structures made from cans.

In the embodiment of FIG. 6 two honeycomb structures of cans 11 are arranged one above the other with interposition of an intermediate plate 33. The intermediate plate 33 is also connected by adhesion to the honeycomb structures of cans 11. The cover plate 14 forms with its side walls 26 an open box which can receive the two layers of cans. The upper cover plate 13 is provided with downwardly directed edges 32 in such a manner that an open box is formed which can be fitted over the lower box. In this manner reinforced edges are formed round the constructional element and the stress to be taken up can be dissipated through said reinforcing edges.

By using beverage cans which are exactly made in standard sizes and which occur in large amounts as refuse and due to the relatively simple assembly of these beverage cans 11 to form a honeycomb structure, the lightweight constructional elements can be used as large-area supports for reflectors and concentrators of a solar heater in countries in which these solar heaters can be used to advantage. Such countries are usually relatively poor undeveloped countries.

Said constructional elements may be several square meters large. The thickness of the plates corresponds to the height of the drink cans used plus the thickness of the cover sheets, i.e. a total of about 118 or 171 mm or a multiple thereof.

At the outer edges the cover plates may be edged and adhered or welded so that a hermetically sealed hollow body is formed.

Due to the sandwich structure described the constructional elements have a high strength and rigidity for their material expenditure and weight. They are resistant to weather and buoyant and can therefore be used for a great variety of purposes.

The material and the thickness of the cover plates is to be adapted to the particular forces to be taken up. Constructional elements or structural members of aluminium beverage cans with aluminium cover plates are extremely large whilst having high loadability. A lightweight constructional element according to the invention may comprise two or more honeycomb structures and an intermediate plate, in particular of aluminium sheet, is arranged between the respective honeycomb structures.

It will be understood that each of the elements described above, or two or more together, may also find a useful application in other types of structures differing from the types described above.

While the invention has been illustrated and described as embodied in a lightweight constructional element of a sandwich structure, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A lightweight constructional element in a sandwich structure with two cover metal plates held by adhesion to and spaced apart by a honeycomb structure, said honeycomb structure comprising a plurality of substantially cylindrical cans, each of which has a bottom and which axes are all substantially at right angles to said cover plates, said cans being arranged in said honeycomb structure contacting each other at a plurality of contact points with a closest possible packing, one row of said cans being offset relative to another adjacent row of said cans by an amount corresponding to the radius of said cans, and said cans being glued together at said contact points.

2. A lightweight constructional element according to claim 1, in which each of said cans is a recycled beverage can and is provided with a cover.

3. A lightweight constructional element according to claim 1, in which said cans are arranged successively contacting each other with their bottoms alternatingly contacting one or the other of said cover metal plates and being distributed uniformly.

4. A lightweight constructional element according to claim 1, in which said cans are placed together contacting each other to form a plurality of intermediate spaces with said intermediate spaces being filled with a load-bearing plastic foam.

5. A lightweight constructional element according to claim 1, further comprising a high-tensile band or wire extending around said plurality of cans in the vicinity of each of said cover metal plates, said wire acting to span said plurality of cans.

6. A lightweight constructional element according to claim 1, in which at least one of said cover metal plates is folded substantially at right angles at its opposing edges so that said cover metal plate forms an open case.

7. A lightweight constructional element according to claim 1, further comprising a frame made of a plurality of U-profile rails having flanges overlapping said cover plates, said frame being structured to at least partially enclose said constructional element.

8. A large-area solar-collector support in a sandwich structure with two cover metal plates held by adhesion to and spaced apart by a honeycomb structure, which is connected by adhesion to said cover metal plates, said honeycomb structure comprising a plurality of substantially cylindrical cans, each of which have a bottom and which axes are all substantially at right angles to said cover plates in which said cans are arranged contacting each other at a plurality of contact points with a closest possible packing, one row of said cans being offset relative to another adjacent row of said cans by an amount corresponding to the radius of said cans, and said cans being glued together at said contact points.

* * * * *